United States Patent
Barnett et al.

(10) Patent No.: US 9,169,780 B2
(45) Date of Patent: Oct. 27, 2015

(54) CONNECTION FOR GENERATOR IN A GAS TURBINE ENGINE

(75) Inventors: Barry Barnett, Markham (CA); Daniel Alecu, Toronto (CA); Andreas Eleftheriou, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1138 days.

(21) Appl. No.: 13/183,848

(22) Filed: Jul. 15, 2011

(65) Prior Publication Data

US 2013/0014513 A1  Jan. 17, 2013

(51) Int. Cl.
*F02C 7/06* (2006.01)
*F02C 7/32* (2006.01)
*F02C 7/36* (2006.01)

(52) U.S. Cl.
CPC ... *F02C 7/06* (2013.01); *F02C 7/32* (2013.01); *F02C 7/36* (2013.01); *F05D 2260/202* (2013.01)

(58) Field of Classification Search
CPC ............... F02C 7/06; F02C 7/32; F02C 7/36; F05D 2260/202; F05D 2260/36; F05D 2260/40; F05D 2220/50; F05D 2220/76; F05D 2220/766; F05D 2240/60; F16D 9/06; F16D 9/08
USPC ........................ 60/39.091, 772, 802; 192/56.1
See application file for complete search history.

(56) References Cited

U.S. PATENT DOCUMENTS

| | | | |
|---|---|---|---|
| 2,642,970 A * | 6/1953 | Szekely | 192/24 |
| 3,855,818 A | 12/1974 | Hochreuter | |
| 4,028,909 A | 6/1977 | Jancic et al. | |
| 4,411,635 A | 10/1983 | Boothroyd et al. | |
| 4,669,999 A * | 6/1987 | Miller | 464/10 |
| 4,871,296 A | 10/1989 | Laessle et al. | |
| 4,932,280 A * | 6/1990 | Becker et al. | 74/665 G |
| 5,069,320 A | 12/1991 | Falk | |
| 5,418,412 A * | 5/1995 | Brucker | 310/75 R |
| 6,082,959 A | 7/2000 | Van Duyn | |
| 6,428,269 B1 | 8/2002 | Boratgis et al. | |
| 6,447,248 B1 | 9/2002 | Kastl et al. | |
| 6,494,032 B2 | 12/2002 | Udall et al. | |
| 6,783,319 B2 | 8/2004 | Doerflein et al. | |
| 6,908,393 B1 | 6/2005 | Falk | |
| 7,296,670 B2 * | 11/2007 | Howard et al. | 192/144 |
| 7,338,379 B2 | 3/2008 | Mancuso et al. | |
| 7,448,808 B2 | 11/2008 | Bouchy et al. | |
| 8,456,051 B2 * | 6/2013 | Raad | 310/83 |
| 2008/0053257 A1 * | 3/2008 | Dusserre-Telmon et al. | 74/11 |
| 2010/0156113 A1 * | 6/2010 | Lemmers, Jr. | 290/1 C |

* cited by examiner

*Primary Examiner* — J. Gregory Pickett
(74) *Attorney, Agent, or Firm* — Norton Rose Fulbright Canada LLP

(57) ABSTRACT

A gas turbine engine having an electric generator includes a transmission shaft extending along a longitudinal axis of the engine and drivingly interconnecting a turbine shaft of the engine and a rotor shaft of the electric generator. The transmission shaft is engaged by splined mating connections with the turbine shaft and the rotor shaft. The transmission shaft has a shear neck defining a reduced radial wall thickness with respect to a remainder of the transmission shaft such as to provide a weakened region of the transmission shaft. An annular support structure, concentric with and surrounding the transmission shaft, is axially located between the shear neck and a forward end of the transmission shaft engaged to the turbine shaft, and includes a bearing operable to rotationally support the transmission shaft.

18 Claims, 5 Drawing Sheets

CONNECTION FOR GENERATOR IN A GAS TURBINE ENGINE

TECHNICAL FIELD

The application relates generally to generators for gas turbine engines and, more particularly, to a connection assembly therefor.

BACKGROUND

It is known to drive a generator with the central shaft assembly of the gas turbine engine, in particular with the low pressure shaft connecting the fan to the rotors of the low pressure turbine. In the unlikely event that the transmission shaft between the generator and central shaft assembly of the engine breaks, the portion of the transmission shaft still being rotated by the central shaft assembly may damage elements of the engine and/or the generator. There is therefore a need for an improved arrangement.

SUMMARY

In one aspect, there is provided a gas turbine engine having an electric generator, comprising: a transmission shaft extending along a longitudinal axis of the engine and drivingly interconnecting a turbine shaft of the engine and a rotor shaft of the electric generator, opposed forward and rearward ends of the transmission shaft being respectively engaged in splined mating connection with the turbine shaft of the engine and the rotor shaft of the electrical generator, such that the transmission shaft is axially movable relative to at least one of the turbine shaft and the rotor shaft, the transmission shaft having a shear neck proximate the rearward end thereof, the shear neck defining a reduced radial wall thickness with respect to a remainder of the transmission shaft such as to provide a weakened region of the transmission shaft; and an annular support structure concentric with and surrounding the transmission shaft, the support structure being axially located between the shear neck and the forward end of the transmission shaft and including a bearing operable to rotationally support the transmission shaft. In another aspect, there is provided a gas turbine engine comprising: a transmission shaft drivingly interconnecting a driving shaft and a driven shaft, the transmission shaft having a weakened region defining a reduced radial wall thickness sized to rupture upon being subjected to a torque exceeding a predetermined threshold to separate the transmission shaft into two portions, a first portion and a second portion; the second portion being rotationally supported by the driven shaft; and a hydrodynamic bearing rotationally supporting the first portion of the transmission shaft and axially located between the weakened region and the driving shaft, the hydrodynamic bearing including a stationary annular support structure concentric with and surrounding the first portion with an annular radial clearance being defined between the support structure and the transmission shaft, and an oil nozzle connected to an oil source and providing oil within the clearance, the clearance being sized to create a pressurized oil film therewithin.

In a further aspect, there is provided a method of allowing continued operation of a gas turbine engine in the event of a failure of a tail-mounted electric generator disposed rearwardly of a turbine shaft of the engine, comprising: rotating a rotor shaft of the generator using a transmission shaft driven by the turbine shaft and axially extending therebetween, the transmission shaft having opposed forward and rearward ends that are respectively supported by the turbine shaft of the engine and the rotor shaft of the electrical generator, the transmission shaft extending through an annular support structure disposed between the forward and rearward ends thereof; allowing a rupture of the transmission shaft to occur at a weakened region axially located between the rearward end of the transmission shaft and the annular support structure when the transmission shaft is exposed to a torque exceeding a predetermined threshold; and at least when the transmission shaft is ruptured, rotationally supporting the forward end of the transmission shaft driven by the turbine shaft by the annular support structure.

DESCRIPTION OF THE DRAWINGS

Reference is now made to the accompanying figures in which.

DETAILED DESCRIPTION

Figure 1:
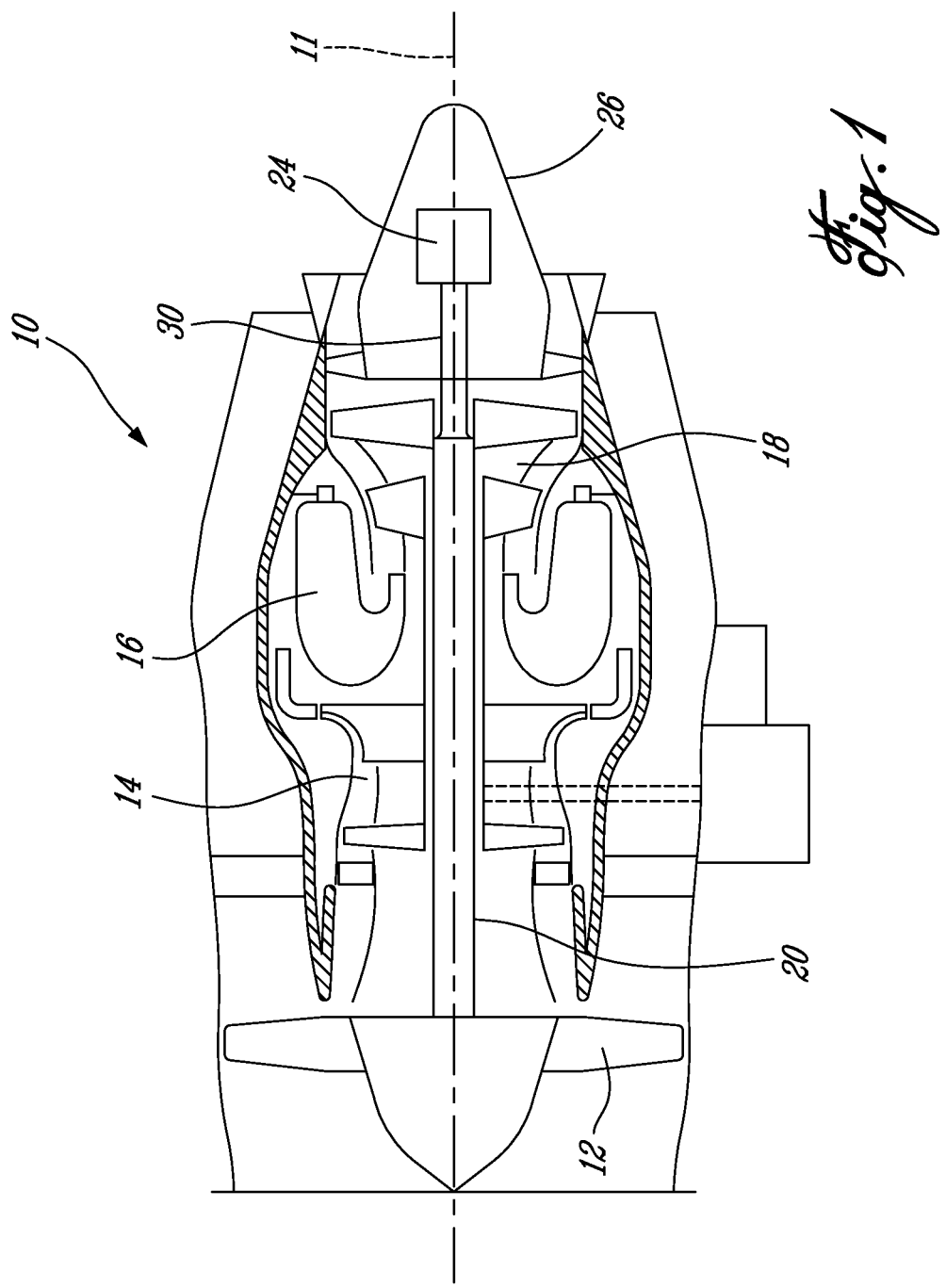
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine includes a central shaft assembly 20 extending along its longitudinal axis 11 and drivingly connecting the turbine section to the fan and compressor section. In a particular embodiment, the central shaft assembly 20 includes a low pressure shaft 22 (see FIG. 2) and a high pressure shaft (not shown) which are concentric and rotate independently from one another, with the low pressure shaft 22 extending within the high pressure shaft. The low pressure shaft 22 interconnects the fan 12 and rotor(s) of a low pressure portion of the turbine section 18, while the high pressure shaft interconnects rotor(s) of the compressor section 14 and rotor(s) of a high pressure portion of the turbine section 18.

Figure 2:
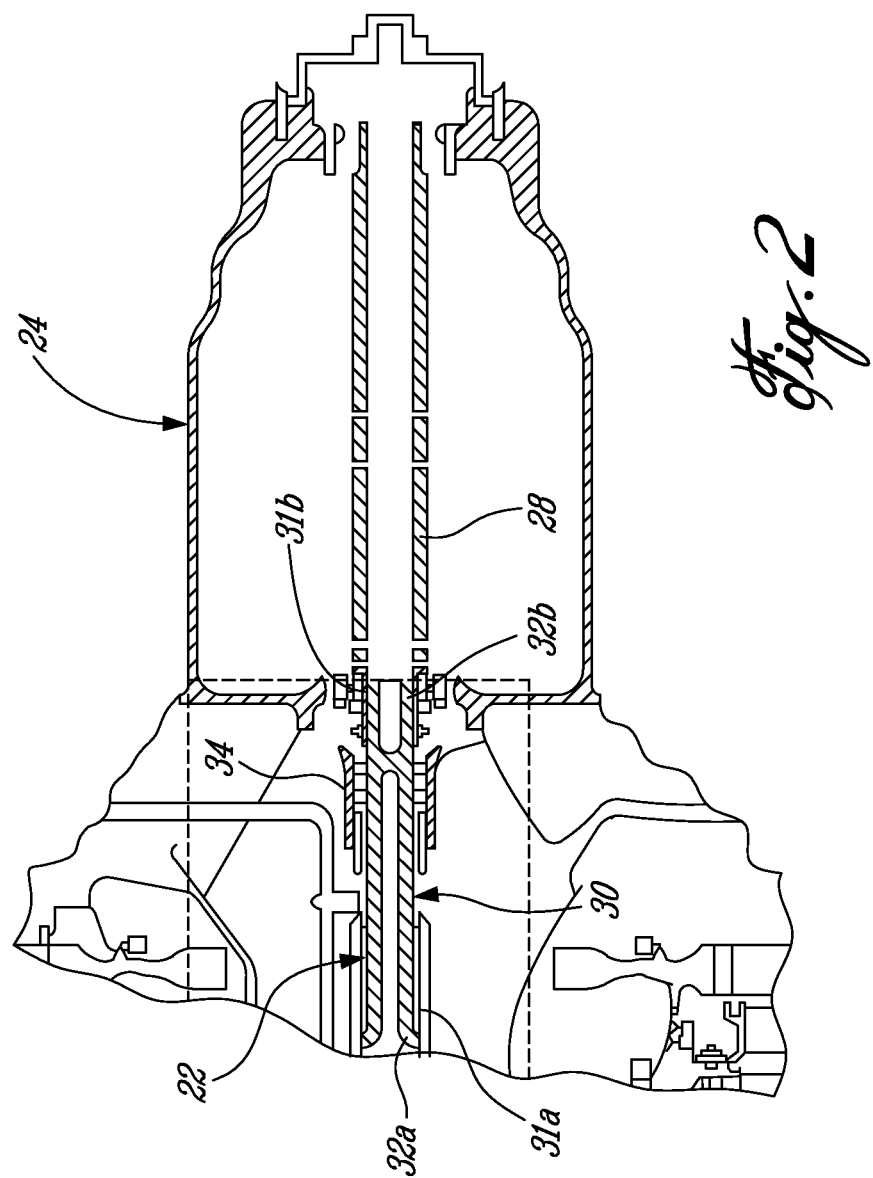
FIG. 2 is a schematic cross-sectional view of a tail-mounted generator and a connection assembly between the generator and a central shaft assembly of a gas turbine engine such as shown in FIG. 1.

Referring to FIGS. 1-2, the engine 10 further includes a tail-mounted generator 24 received within a tailcone 26 of the engine 10, rearwardly of the central shaft assembly 20. The tail mounted generator 24 includes a rotor shaft 28 which is attached to one end 32b of a transmission shaft 30 such as to rotate therewith, for example through a spline connection 31b. The opposed end 32a of the transmission shaft 30 is attached to the low pressure shaft 22, for example also through a spline connection 31a. As such, the rotor shaft 28 of the generator 24 is driven by a turbine shaft of the central shaft assembly 20, and in the embodiment shown by the low pressure shaft 22, through the transmission shaft 30 which extends along the longitudinal axis 11 of the engine.

The connection between the transmission shaft 30 and the low pressure shaft 22 and/or the connection between the transmission shaft 30 and the rotor shaft 28 of the generator 24 is/are designed to allow relative axial movement between the shafts. As such, relative axial movement is allowed between the generator 24 and the low pressure shaft 22, to allow for the thermal expansion of the various elements, for example of the turbine exhaust case 34. In the embodiment shown, the transmission shaft 30 and the low pressure shaft 22 are interconnected through a spline connection made of a suitable type of polymer, such as for example a suitable polyimide-based plastic such as one of the polymers known under the name of Vespel™.

Figure 3:
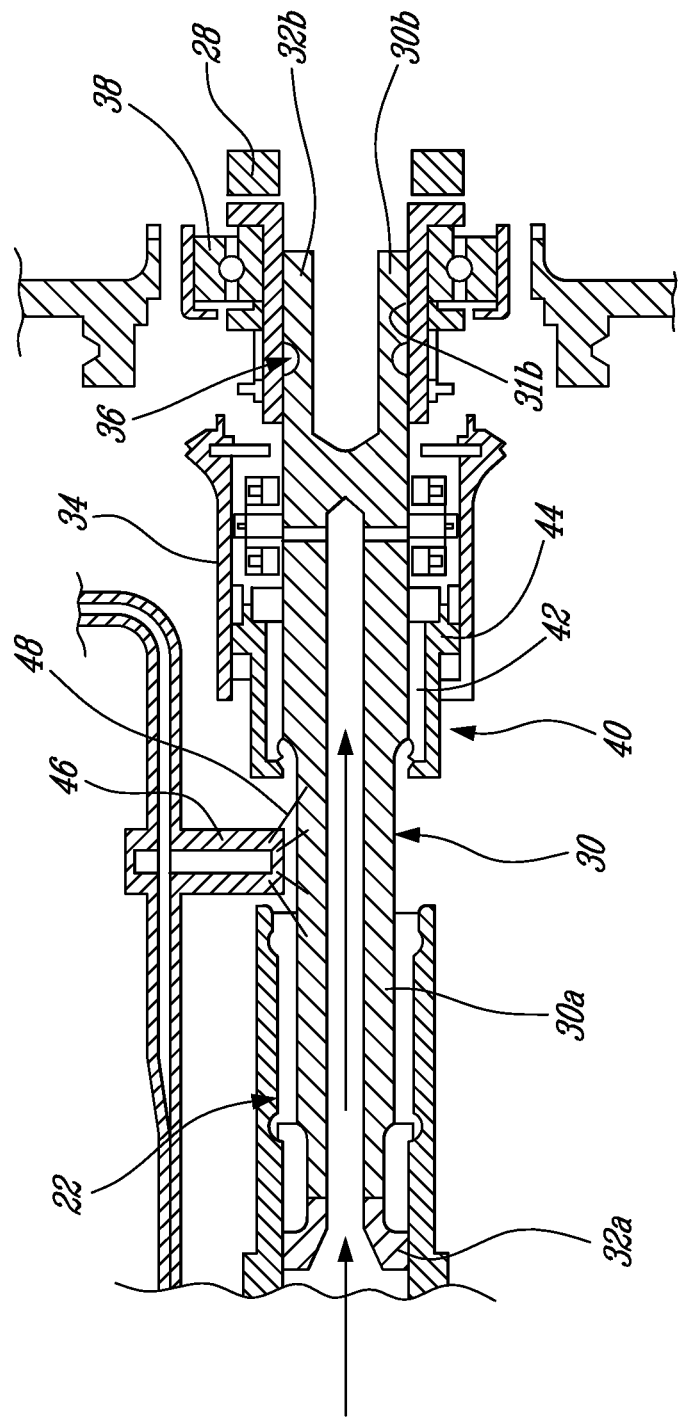
FIG. 3 is a schematic cross-sectional view of the connection assembly of FIG. 2.
Figure 4:
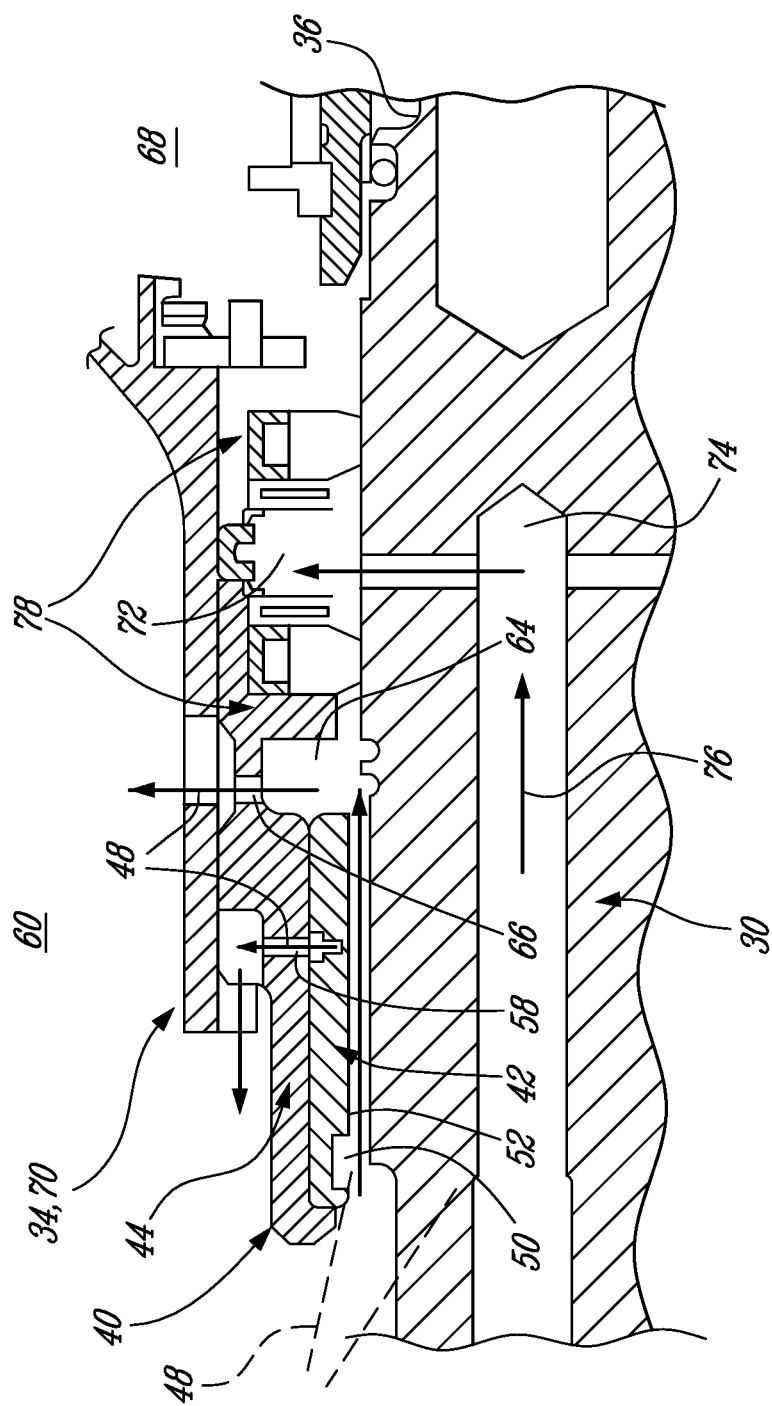
FIG. 4 is a schematic enlarged cross-sectional view of part of the connection assembly of FIG. 2.

Referring to FIGS. 3-4, the transmission shaft 30 is part of a fail-safe connection between the low pressure shaft 22 and the rotor shaft 28 of the generator 24, which allows continued operation of the engine 10 in the event of a failure of the generator 24, more particularly a failure which would impede the rotation of the rotor shaft 28 and as such produce a torque exceeding acceptable limits on the transmission shaft 30.

As such, the transmission shaft 30 includes a weakened region defined by a shear neck 36 which is axially located proximate the rearward end of the transmission shaft, and thus near and forward of the generator 24. The shear neck 36 forms a reduced radial wall-thickness portion of the transmission shaft 30, which extends about at least a portion of the circumference of the transmission shaft. For example, in one embodiment the shear neck 36 may extend about the full circumference of the transmission shaft, either on the external or internal side thereof. However, in another possible embodiment, the shear neck 36 may have only several discrete portions having a reduced radial wall thickness, for example which are angularly spaced about the shaft. In other embodiment, the shear neck 36 may simply be formed by holes which extend partially or fully through the radial wall of the transmission shaft, such as to define a weakened region at a given axial location thereon. In the embodiment shown, the transmission shaft 30 is keyed into the generator rotor shaft 28, and the shear neck is located within the rotor shaft 28 just forward of the connection 31b between the two shafts 28,30, as close to the generator 24 as possible. The shear neck 36 is sized and/or otherwise configured (ex.: by having a thinner radial wall thickness than a remainder of the transmission shaft, or a reduced diameter relative to the remainder of the shaft, etc) such as to shear or otherwise rupture or break when the torque applied to the transmission shaft 30 exceeds a predetermined threshold. The particular threshold will depend on the characteristics of the engine and/or the generator. Alternate configurations for the weakened region are also possible. For example, the shear neck may include a region which is inherently weaker (but not necessarily of a reduced diameter or thickness) than that of a remainder of the transmission shaft 30, such that it will shear when the torque on the shaft exceeds the afore-mentioned predetermined threshold. Alternately still, the weakened region may comprise a friction coupling or a flexible or bellows-type coupling which is inherently weaker than a remainder of the shaft and thus which is shear when the predetermined torque threshold value is reached.

A bearing element 38 (see FIG. 3), for example a bushing or roller/ball bearing, rotationally supports the rotor shaft 28 of the generator 24 rearwardly of the shear neck 36. The rotor shaft 28 of the generator 27 in turns supports the rearward end of the transmission shaft 30, which remaining in rotational engagement due to the splined mating engagement therebetween. In the embodiment shown, the bearing element 38 thus supports, albeit indirectly, the rear end of the transmission shaft 30 by supporting the forward portion of the generator rotor shaft 28 that is matingly engaged with the transmission shaft 30. The forward end of the transmission shaft 30 is similarly in driving engagement with, and supported by, the turbine shaft of the main engine via their splined mating engagement. Accordingly, the transmission shaft 30 is able to axially move relatively to at least one of the turbine shaft and the rotor shaft of the generator in order to be able to absorb thermal growth and other axial misalignment which may occur. However, given their splined interconnection, the transmission shaft remains rotatingly engaged with both the turbine shaft and the rotor shaft of the generator such as to transmit rotation from the engine to the generator and/or vice versa.

The fail-safe connection further includes an annular support structure 40, concentric with and surrounding the transmission shaft 30, nearer to the low pressure shaft 22, such that the shear neck 36 is located between the bearing element 38 and the support structure 40. The support structure 40 is designed to act as a second, or "back-up", bearing which may only be used when the shear neck 36 is ruptured, and therefore in a particular embodiment the annular support structure 40 is not active as such during normal operation of the engine. Alternately, however, the support structure 40 may also be used in normal operating conditions as a further bearing support for the transmission shaft 30, and thus need not only be active in the event of a transmission shaft shear.

In a particular embodiment, the support structure 40 includes a stationary cylindrical bumper 42 surrounding the transmission shaft 30 to define a small radial clearance therebetween, for example approximately 0.005 inch to 0.015 inch. The bumper 42 is surrounded and supported by a bumper housing 44 attached to the turbine exhaust case 34. In a particular embodiment, the bumper 42 has a length corresponding to about 1 to about 2 times the diameter of the transmission shaft 30 to provide proper support.

Figure 5:
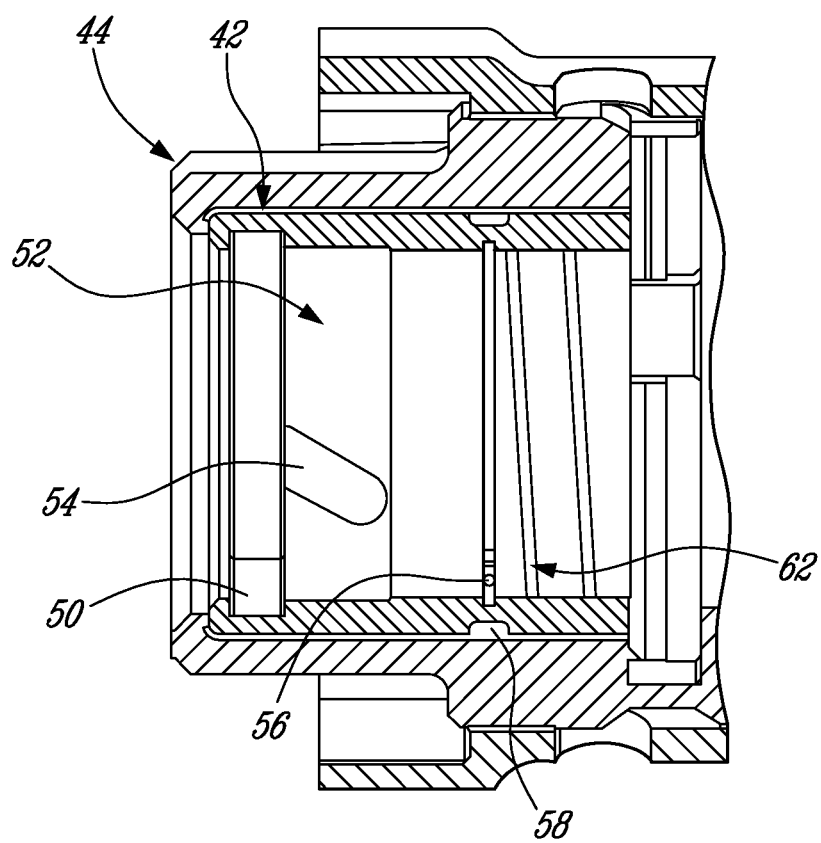
FIG. 5 is a schematic cross-sectional view of a bumper of the connection assembly of FIG. 2.

An oil nozzle 46 (see FIG. 3) connected to an oil source (not shown) is located forwardly of and adjacent to the bumper 42, and delivers oil 48 to the radial clearance gap between the bumper 42 and transmission shaft 30. Referring to FIGS. 4-5, the oil 48 sprayed onto the transmission shaft 30 is spun out by centrifugal force into an inlet groove 50 defined in the inner surface 52 of the bumper 42, at the forward end of the bumper adjacent the oil nozzle 46.

As shown in FIG. 5, the inner surface 52 of the bumper 42 includes one or more angled dead-ended slots 54 which are angled such that the relative velocity between the rotating transmission shaft 30 and the stationary bumper 42 causes the oil 48 to flow rearwardly within the clearance, and pressurizes the oil to form a pressurized oil film around the transmission shaft 30. The inner surface 52 of the bumper also includes a collecting groove 56 in fluid communication with one or more radially-extending release holes 58 (see also FIG. 4) which collect the oil 48 and direct it radially away from the transmission shaft 30 and out into the oil-exposed cavity 60 through which the transmission shaft 30 extends. The inner surface 52 of the bumper 42 further includes a helical slot 62 oriented to define a wind back feature, directing the oil 48 that flows rearwardly of the collecting groove 56 back toward it.

Referring back to FIG. 4, the bumper housing 44 also defines an annular collecting cavity 64 around the transmission shaft 30 rearwardly of the bumper 42, and one or more radially-extending release holes 66 which direct the oil 48 away from the transmission shaft 30 and into the oil-exposed cavity 60, through corresponding openings in the exhaust case 34. The bumper 42 and bumper housing 44 thus create a flow of pressurized oil around and along the portion of the transmission shaft 30 which is surrounded thereby.

In the event of the rupture of the shear neck 36 of the transmission shaft 30, thereby separating the transmission shaft 30 into two portions, namely forward and rear portions 30*a* and 30*b* respectively (see FIG. 3), the smaller rear portion 30*b* of the transmission shaft 30 defined rearwardly of the shear neck 36 remains supported by the forward end of the generator rotor shaft 28, which is in turn supported by the generator bearing element 38. The larger forward portion 30*a* of the sheared transmission shaft 30, forward of the shear neck 36, which still rotates together with the low pressure shaft 22, is then supported by the bumper 42, with the pressurized oil film around the transmission shaft 30 making the bumper 42 a hydrodynamic bearing. The bumper 42 thus support the forward rotating portion 30*a* of the transmission shaft 30 to prevent it from flailing around, and as such, allows continued operation of the engine 10 despite the generator failure. The pressurized oil film also cools the bumper 42. The material of the bumper 42 is selected such as to be able to withstand rubbing with the transmission shaft 30 if the oil forces are insufficient to steady the shaft 30. In a particular embodiment, the bumper 42 is made of bronze.

Although it is possible to activate the pressurized oil film only when the back-up bearing is required, i.e. upon rupture of rupture of the shear neck 36 and thus shear of the transmission shaft 30, in a particular embodiment, the pressurized oil film is activated also during normal operation. During normal operation, the pressurized oil flow around and along the portion of the transmission shaft 30 surrounded by the bumper 42 provides supplemental cooling to the shaft 30.

Referring back to FIG. 4, in the embodiment shown, the generator 24 is received in an air-exposed cavity 68, while the transmission shaft 30 extends through the oil-exposed cavity 60. The transmission shaft 30 thus extends through a tubular entry 70 of the generator cavity 68 defined by the exhaust case 34 such as to be connected to the rotor shaft 28 of the generator 24, with the shear neck 36 being located within the generator cavity 68 or its tubular entry 70, and the bumper 42 being located in the oil-exposed cavity 60. A sealed buffer cavity 72 is defined around the transmission shaft 30 within the tubular entry 7, between the air-exposed cavity 68 and the oil-exposed cavity 60. The transmission shaft 30 is hollow and defines a central conduit 74 extending along its longitudinal axis, through which pressurized air 76 circulates. The conduit 74 within the transmission shaft 30 is in fluid communication with the sealed buffer cavity 72. The buffer cavity 72 thus filled with pressurized air to form an air seal which prevents the oil of the bumper 42 from penetrating the generator cavity 68 through the tubular entry 70.

In the embodiment shown, the sealed buffer cavity 72 is enclosed between two air seals 78, such as carbon seals surrounding the transmission shaft 30 within the tubular entry 70 of the generator cavity 68. Other types of seals may be used instead of the air seals 78, for example ceramic brush seals, labyrinth seals, PTFE lip seals, etc.

The pressurized oil film around the transmission shaft 30 within the bumper 42 is in heat exchange relationship with the pressurized air in the conduit 74 defined within the transmission shaft 30. Accordingly, the pressurized oil film provides cooling to the pressurized air 76 flowing into the buffer cavity 72, thus reducing the temperature of the air to which the air seals 78 and the front of the generator 24 are exposed.

The above described fail-safe connection assembly may thus allow for continued engine operation in the event that the transmission shaft 30 shears due to failure of the generator 24, while minimizing the risk of damage caused by the rotating portion 30*a* of the transmission shaft 30.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine having an electric generator, comprising:
   a transmission shaft extending along a longitudinal axis of the engine and drivingly interconnecting a turbine shaft of the engine and a rotor shaft of the electric generator, opposed forward and rearward ends of the transmission shaft being respectively engaged in splined mating connection with the turbine shaft of the engine and the rotor shaft of the electrical generator, such that the transmission shaft is axially movable relative to at least one of the turbine shaft and the rotor shaft, the transmission shaft having a shear neck proximate the rearward end thereof, the shear neck defining a reduced radial wall thickness with respect to a remainder of the transmission shaft such as to provide a weakened region of the transmission shaft; and
   an annular support structure concentric with and surrounding the transmission shaft, the support structure being axially located between the shear neck and the forward end of the transmission shaft and including a bearing operable to rotationally support the transmission shaft, the bearing including an annular bumper surrounding the transmission shaft with a radial clearance being defined therebetween, an oil source adjacent the bumper and providing oil to the clearance, and a pressurized oil film created by the oil source circulating around and along the transmission shaft within the clearance, the support structure defining a hydrodynamic journal bearing rotationally supporting the transmission shaft.

2. The engine as defined in claim 1, wherein the shear neck has a reduced diameter, relative to the remainder of the transition shaft, about a full circumference of the transmission shaft.

3. The engine as defined in claim 1, wherein the oil source includes an actuation mechanism to alternately allow and prevent a flow of oil therefrom, the actuation mechanism preventing the flow of oil when the weakened region remains intact.

4. The engine as defined in claim 3, wherein the generator is contained in an air-exposed cavity, the engine further comprising an air-filled sealed buffer cavity surrounding the transmission shaft between the support structure and the shear neck to prevent the oil from entering the air-exposed cavity.

5. The engine as defined in claim 4, wherein the transmission shaft includes a hollow core for circulation of pressurized air, the core being in fluid communication with the sealed buffer cavity, the pressurized air within the core and pressurized oil film around the transmission shaft being in heat exchange relationship with one another.

6. The engine as defined in claim 1, wherein the bumper including at least one angled slot defined in an inner surface thereof adjacent the oil source and directing the oil to form the pressurized oil film around the transmission shaft.

7. The engine as defined in claim 6, wherein the bumper is located between the oil source and the weakened region, the bumper including at least one wind back angled groove defined in the inner surface adjacent a weakened region side of the bumper, the wind back groove being angled opposite of the angled slot to direct the oil back toward the oil source, and at least one release hole extending through the bumper and providing fluid communication between the clearance and an oil-exposed cavity through which the transmission shaft extends.

8. A gas turbine engine comprising:
a transmission shaft drivingly interconnecting a driving shaft and a driven shaft, the transmission shaft having a weakened region defining a reduced radial wall thickness sized to rupture upon being subjected to a torque exceeding a predetermined threshold to separate the transmission shaft into two portions, a first portion and a second portion;
the second portion being rotationally supported by the driven shaft; and
a hydrodynamic bearing rotationally supporting the first portion of the transmission shaft and axially located between the weakened region and the driving shaft, the hydrodynamic bearing including a stationary annular support structure concentric with and surrounding the first portion with an annular radial clearance being defined between the support structure and the transmission shaft, and an oil nozzle connected to an oil source and providing oil within the clearance, the clearance being sized to create a pressurized oil film therewithin.

9. The engine as defined in claim 8, wherein the weakened region is defined by a shear neck formed in the transmission shaft.

10. The engine as defined in claim 8, wherein the oil nozzle provides oil to the clearance during both normal engine operation and when the weakened region is ruptured.

11. The engine as defined in claim 8, wherein the driven shaft extends at least partially through an air-exposed cavity, the assembly further including an air-filled sealed buffer cavity surrounding the transmission shaft between the support structure and the weakened region to prevent the oil from entering the air-exposed cavity.

12. The engine as defined in claim 11, wherein the transmission shaft includes a hollow core for circulation of pressurized air, the core being in fluid communication with the sealed buffer cavity, the pressurized air within the core and pressurized oil film around the transmission shaft being in heat exchange relationship with one another.

13. The engine as defined in claim 8, wherein the support structure includes a bumper concentric with the transmission shaft and defining the annular clearance, the bumper including at least one angled slot defined in an inner surface thereof at an end of the bumper adjacent the oil nozzle, the slot being oriented to direct the oil film away from the nozzle.

14. The engine as defined in claim 13, wherein the bumper includes a collecting groove defined in the inner surface, the collecting groove being in fluid communication with release holes defined through the bumper to expel the oil away from the transmission shaft, the collecting groove being located away from an end of the bumper adjacent the oil nozzle.

15. The engine as defined in claim 8, wherein the support structure includes a bumper concentric with the transmission and defining the annular clearance, the bumper being made of bronze.

16. A method of allowing continued operation of a gas turbine engine in the event of a failure of a tail-mounted electric generator disposed rearwardly of a turbine shaft of the engine, comprising:
rotating a rotor shaft of the generator using a transmission shaft driven by the turbine shaft and axially extending therebetween, the transmission shaft having opposed forward and rearward ends that are respectively supported by the turbine shaft of the engine and the rotor shaft of the electrical generator, the transmission shaft extending through an annular support structure disposed between the forward and rearward ends thereof;
allowing a rupture of the transmission shaft to occur at a weakened region axially located between the rearward end of the transmission shaft and the annular support structure when the transmission shaft is exposed to a torque exceeding a predetermined threshold; and
at least when the transmission shaft is ruptured, rotationally supporting the forward end of the transmission shaft driven by the turbine shaft by the annular support structure, including creating a pressurized oil film between the forward end and the annular support structure, and using the pressured oil film as a hydrodynamic bearing to rotationally support the forward end of the transmission shaft.

17. The method as defined in claim 16, further including, prior to the transmission shaft being ruptured, cooling the transmission shaft within the annular structure by creating the pressurized oil film between the transmission shaft and the annular structure.

18. The method as defined in claim 16, further comprising creating the pressurized oil film by circulating the oil toward the rearward end of the transmission shaft, preventing the oil from entering a generator cavity containing the generator and at least part of the rearward end of the transmission shaft by circulating pressurized air within the transmission shaft in heat exchange relationship with the pressurized oil film to a pressurized buffer cavity which surrounds the transmission shaft and seals an entry of the generator cavity around the transmission shaft.

* * * * *